(12) United States Patent
Thomas

(10) Patent No.: US 12,130,419 B2
(45) Date of Patent: *Oct. 29, 2024

(54) ELECTRO-OPTICS BASED OPTICAL DEVICES

(71) Applicant: Maranon, Inc., Eagle Rock, VA (US)

(72) Inventor: James Thomas, Eagle Rock, VA (US)

(73) Assignee: Maranon, Inc, Eagle Rock, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,305

(22) Filed: Apr. 18, 2023

(65) Prior Publication Data

US 2023/0251482 A1 Aug. 10, 2023

Related U.S. Application Data

(63) Continuation of application No. 17/748,935, filed on May 19, 2022, now Pat. No. 11,698,521, which is a continuation of application No. 15/931,045, filed on May 13, 2020, now Pat. No. 11,340,443.

(60) Provisional application No. 62/846,882, filed on May 13, 2019.

(51) Int. Cl.
*G02B 23/10* (2006.01)
*G02B 23/12* (2006.01)
*G02B 25/00* (2006.01)

(52) U.S. Cl.
CPC ........... *G02B 23/105* (2013.01); *G02B 23/12* (2013.01); *G02B 25/004* (2013.01)

(58) Field of Classification Search
CPC ..... G02B 23/105; G02B 23/12; G02B 25/004
USPC ....................................... 359/362
See application file for complete search history.

(56) References Cited

U.S. PATENT DOCUMENTS

| 4,221,966 | A | | 9/1980 | Kerr et al. | |
|---|---|---|---|---|---|
| 5,943,174 | A | * | 8/1999 | Bryant | H01J 29/98 359/809 |
| 6,288,386 | B1 | * | 9/2001 | Bowen | G02B 23/12 313/532 |
| 11,340,443 | B2 | | 5/2022 | Thomas | |
| 11,698,521 | B2 | | 7/2023 | Thomas | |
| 2008/0290260 | A1 | | 11/2008 | Moody | |
| 2008/0296500 | A1 | * | 12/2008 | Ramboyong | G02B 23/12 250/332 |
| 2010/0001927 | A1 | | 1/2010 | Hough | |

(Continued)

FOREIGN PATENT DOCUMENTS

| WO | 9404950 | | 3/1994 | |
|---|---|---|---|---|
| WO | WO-9404950 A1 | * | 3/1994 | G02B 23/12 |

OTHER PUBLICATIONS

Extended Search Report Issued Feb. 1, 2023, by the European Patent Office in connection with the European patent application No. 20805566.5.

(Continued)

*Primary Examiner* — Sharrief I Broome
(74) *Attorney, Agent, or Firm* — Charles S. Sara; Elizabeth L. Neal; DeWitt LLP

(57) ABSTRACT

The present invention is an optical assembly featuring an architecture which allows adjustment of both objective lenses and the electronic sensing assemblies in the optical assembly. Electrical connections in the housings of the various subassemblies allow focusing adjustment by rotational and/or translational movement for increased adjustability.

23 Claims, 10 Drawing Sheets

(56) References Cited

U.S. PATENT DOCUMENTS

Figure 1A:
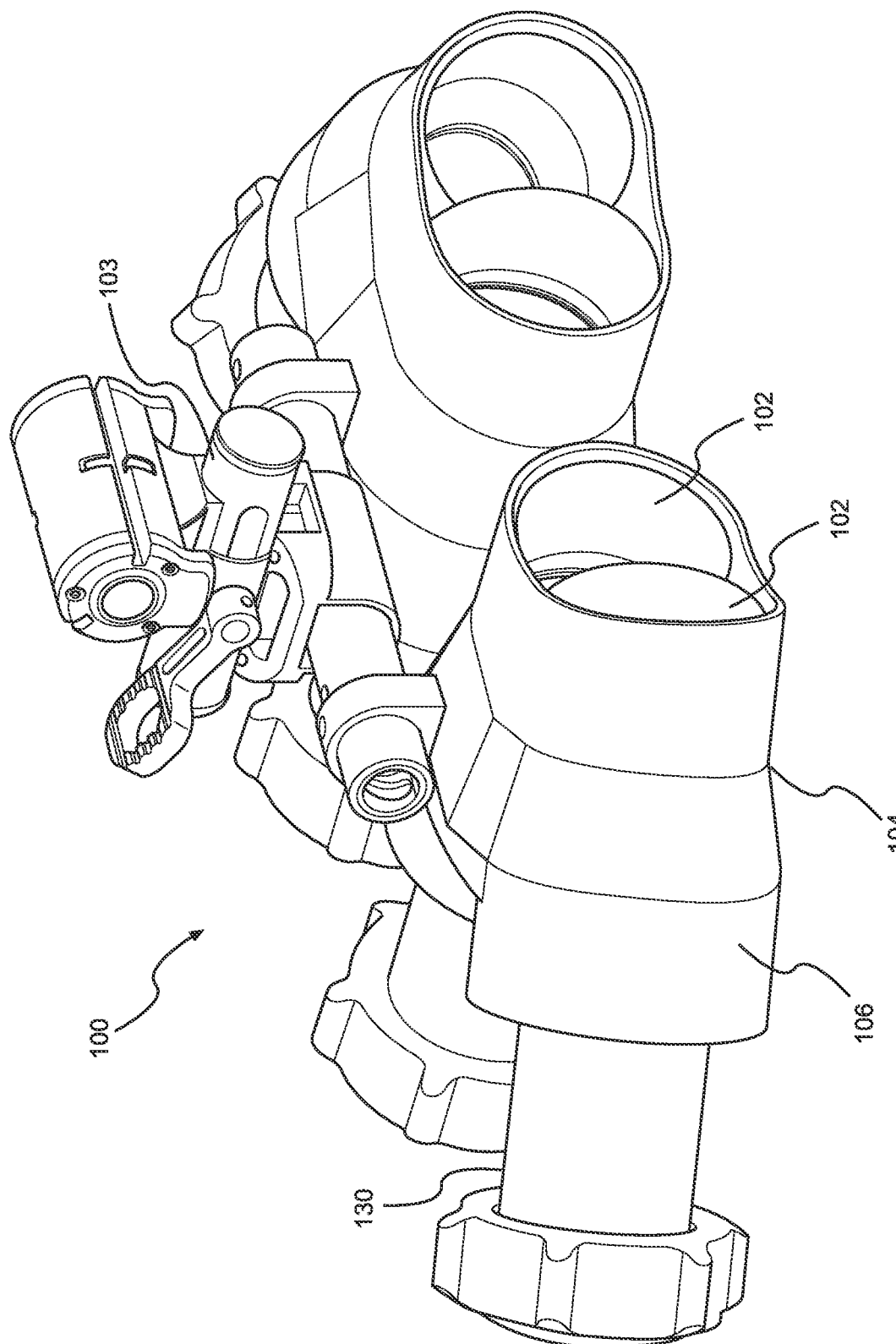

2010/0264310 A1* 10/2010 Willey ................. G02B 23/12
                                                   250/330
2012/0098971 A1    4/2012 Hansen et al.
2012/0162758 A1    6/2012 Zimmerman et al.
2012/0257005 A1* 10/2012 Browne ............... G02B 27/017
                                                   348/E7.001
2015/0369565 A1* 12/2015 Kepler ................ G02B 27/106
                                                   348/143
2016/0369942 A1* 12/2016 DiCarlo ............... G02B 23/18

OTHER PUBLICATIONS

International Preliminary Report on Patentability for PCT/US2020/032661 dated Nov. 25, 2021.
International Search Report and Written Opinion for PCT/US2020/032661 dated Aug. 12, 2020.
Canada Office Action received in Canada Patent Application 3139897, mailed on Jan. 5, 2024, 5 pages.
Non-Final Office Action Received for U.S. Appl. No. 15/931,045, mailed on Feb. 7, 2022, 17 pages.
Non-Final Office Action Received for U.S. Appl. No. 15/931,045, mailed on May 18, 2021, 17 pages.
Non-Final Office Action Received for U.S. Appl. No. 17/748,935, mailed on Dec. 6, 2022, 9 pages.
Singapore Search Report and Written Opinion Received for Singapore Patent Application 11202112498R, mailed on Feb. 13, 2024, 8 pages.

* cited by examiner

ELECTRO-OPTICS BASED OPTICAL DEVICES

CROSS-REFERENCE TO RELATED APPLICATIONS

The present application is a continuation of co-pending U.S. application Ser. No. 17/748,935, filed May 19, 2022, which application was published on Sep. 8, 2022, as US2022/0283423, and which application is a continuation of U.S. application Ser. No. 15/931,045, filed May 13, 2020, which application was published on Nov. 19, 2020, as US2020/0363622, and further claims the benefit of prior-filed, U.S. Provisional Patent Application No. 62/846,882, filed on May 13, 2019, the contents of which are incorporated herein by reference in their entireties.

BACKGROUND OF THE INVENTION

The present application is directed to the field of imaging. More specifically, the present application is directed to the field of military and commercial image enhancement devices, and an improved optical assembly therefor.

Many optical devices have generally been locked in an architecture that results in a heavy device. For example, the usual architecture for night vision goggles consists of an objective lens, image sensor, and eyepiece. These three main elements are packaged together as an optical assembly. This assembly is then mounted on mechanical members which permit adjustment of the assembly to align with the eye or eyes when mounted on a helmet that is worn on the head. The prior art architecture has the image sensor housing as the reference frame for all other aspects of the design, i.e. the object lens moves with respect to the sensor to adjust focus. Likewise, the eyepiece moves with respect to the sensor output for eyepiece focus. Finally, the mounting mechanisms and optical channel adjustments are also made with respect to the sensor. This type of architecture exists for both the main types of sensors, image intensifiers and thermal sensors, as well as applications, such as night vision binoculars, helmet mounted monoculars, sensor fusion systems, and rifle scopes.

The prior art moves the eyepiece and/or objective lens relative to the sensor and/or other fixed system elements, such as, but not limited to, a fixed housing or intensifier tube, to obtain focus in night vision goggles. Likewise, the prior art moves the eyepiece within a fixed housing to focus a binocular. There are a multitude of reasons for this architecture of a central housing with adjustable lenses. First, this is the natural progression of technology development from telescopes and binoculars to electro-optical versions of those systems. In telescopes, binoculars, and rifle scopes, the eyepieces have long been the avenue for focus adjustment. The mechanical bodies of the objective lenses were often fixed to natural mounting points on devices such as tripods or rifles. Objective lenses are often large and in locations that can be uncomfortable to reach. The eyepieces are much smaller and located near to the eye. When an electro-optical sensor is placed between the two lenses of those optical systems it is now required that both the objective and eyepiece are independently focused. As a result, designers simply made the objective lens adjustable.

Additionally, electro optical sensors require power to operate. This creates a design impediment. If either the objective, or eyepiece lens, are fixed, then the sensor must rotate. Very special electrical connections would be required in order for the sensor to operate while under rotation. Such connections are known in the art but are expensive and increase the overall complexity of an electro-optical system.

These problems are accentuated when multiple optical channels are combined such as in the Panoramic Night Vision Goggles (PNVG). The system designer now has 4 sets of lenses and sensors to align and operate. The past approach for this design is to have the fix the eyepiece lens to sensor output, e.g. allow no adjustment, sort and match sensors to lenses, and then adjust only the objective lens. However, electro-optical performance is reduced and costs are increased. Electro-optical performance is reduced as there is now no eyepiece focus. If the human observer has a different optical prescription than the prescription set by the eyepiece, they will view the image output from the sensor as out of focus and fuzzy. The match of the tubes to eyepieces is done to make the nominal focus of all four sensors to be the same but requires the manufacturer to sort lenses for focal length and match them to the sensors opto-mechanical length. If a match pair cannot be found then either new lenses, new sensors, or both must be made and the matching process restarted. Obviously, this is very costly. This issue also exists in binoculars, if not to the degree of the multi-channel design.

For the above reasons, as well as others, different architectures have not been explored in the optics industry. The proposed art will remedy these problems with a simple but ground breaking architecture.

BRIEF SUMMARY

The present invention is an optical assembly comprising an eyepiece fixed in a physical position with respect to an observer. The assembly also includes an image sensing assembly having an image sensor, at least one electrical connection, and an output image through the eyepiece, as well as an objective lens. At least one of the image sensing assembly and the objective lens moves for focusing an image projected through the eyepiece to an eye of the observer.

The objects and advantages of the invention will appear more fully from the following detailed description of the embodiments of the invention and examples.

BRIEF DESCRIPTION OF THE DRAWING(S)

FIGS. 1a, 1b, 1c, and 1d depict perspective, partial cross-sectional, partial top, and partial perspective views, respectively, of an exemplary embodiment of an optical assembly.

Figure 1B:
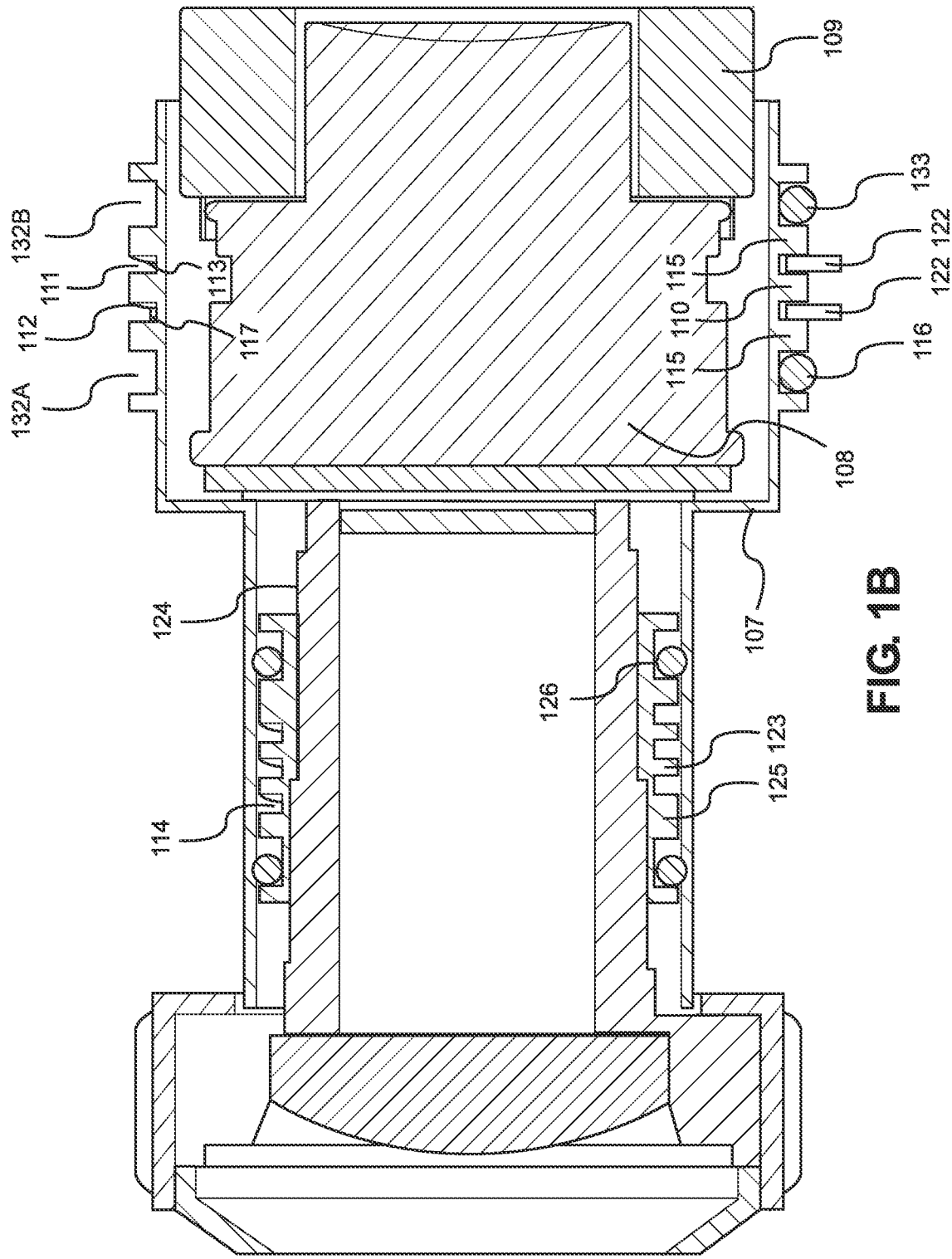
Figure 1C:
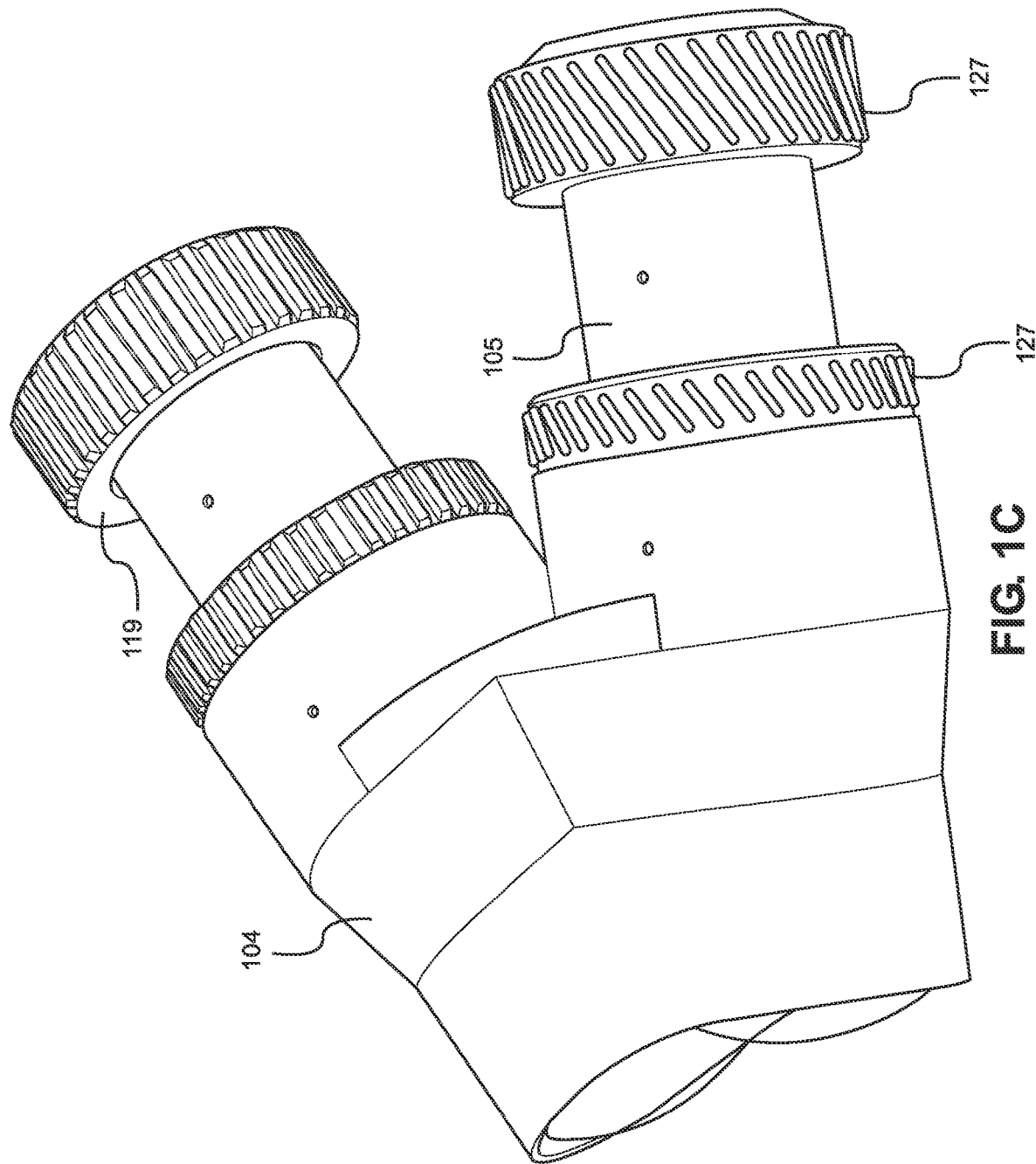
Figure 1D:
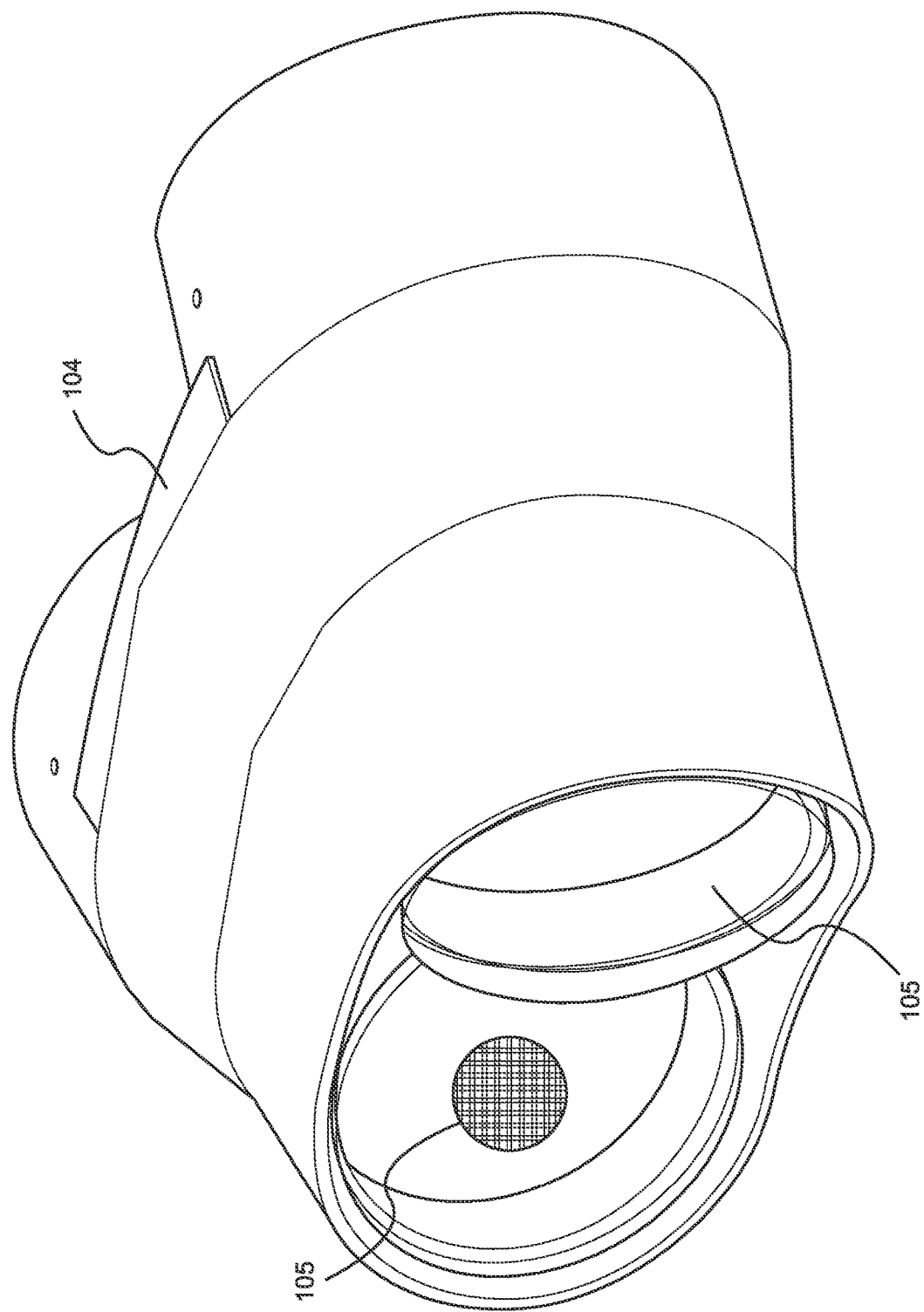
Figure 1E:
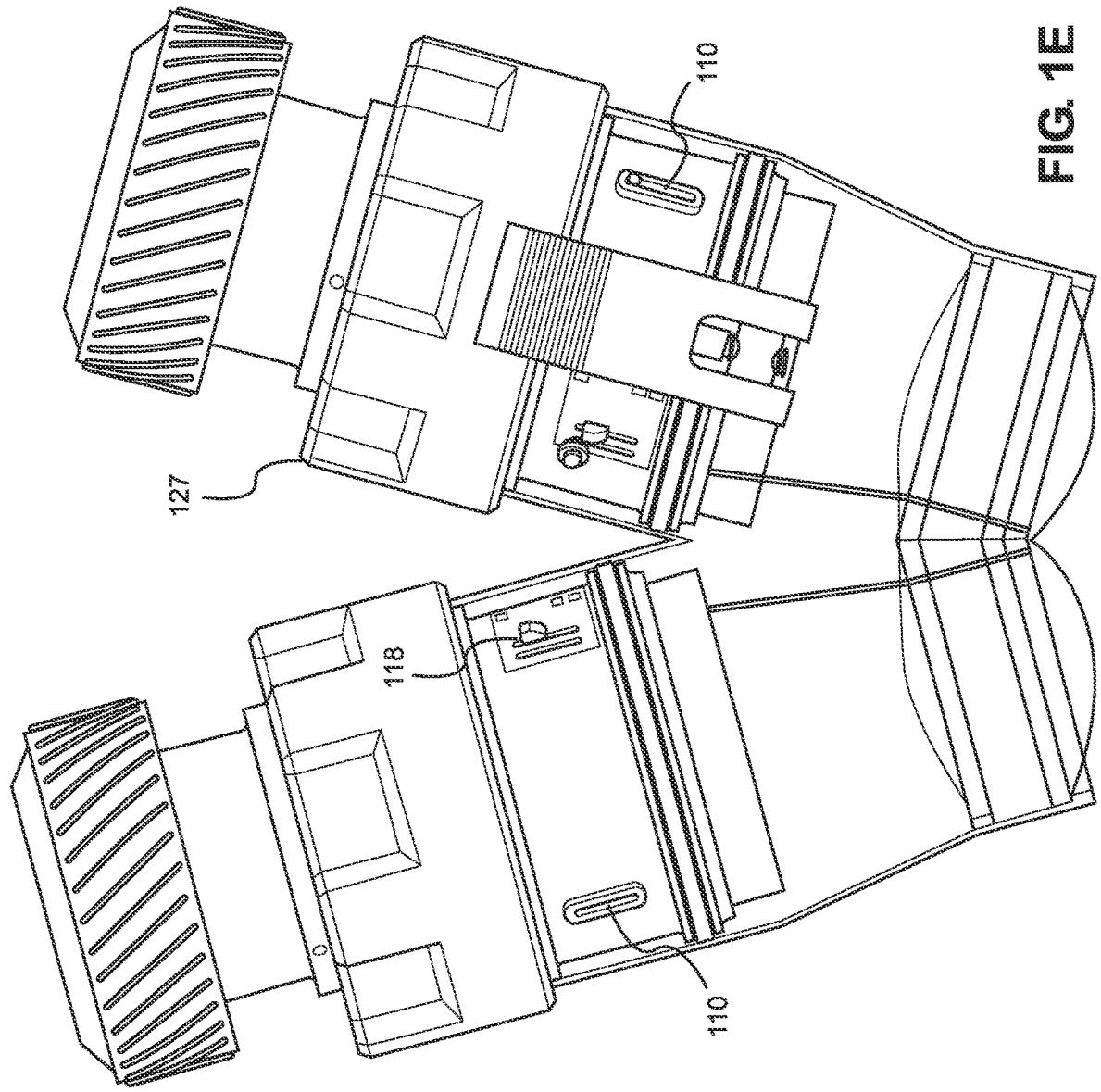
Figure 1F:
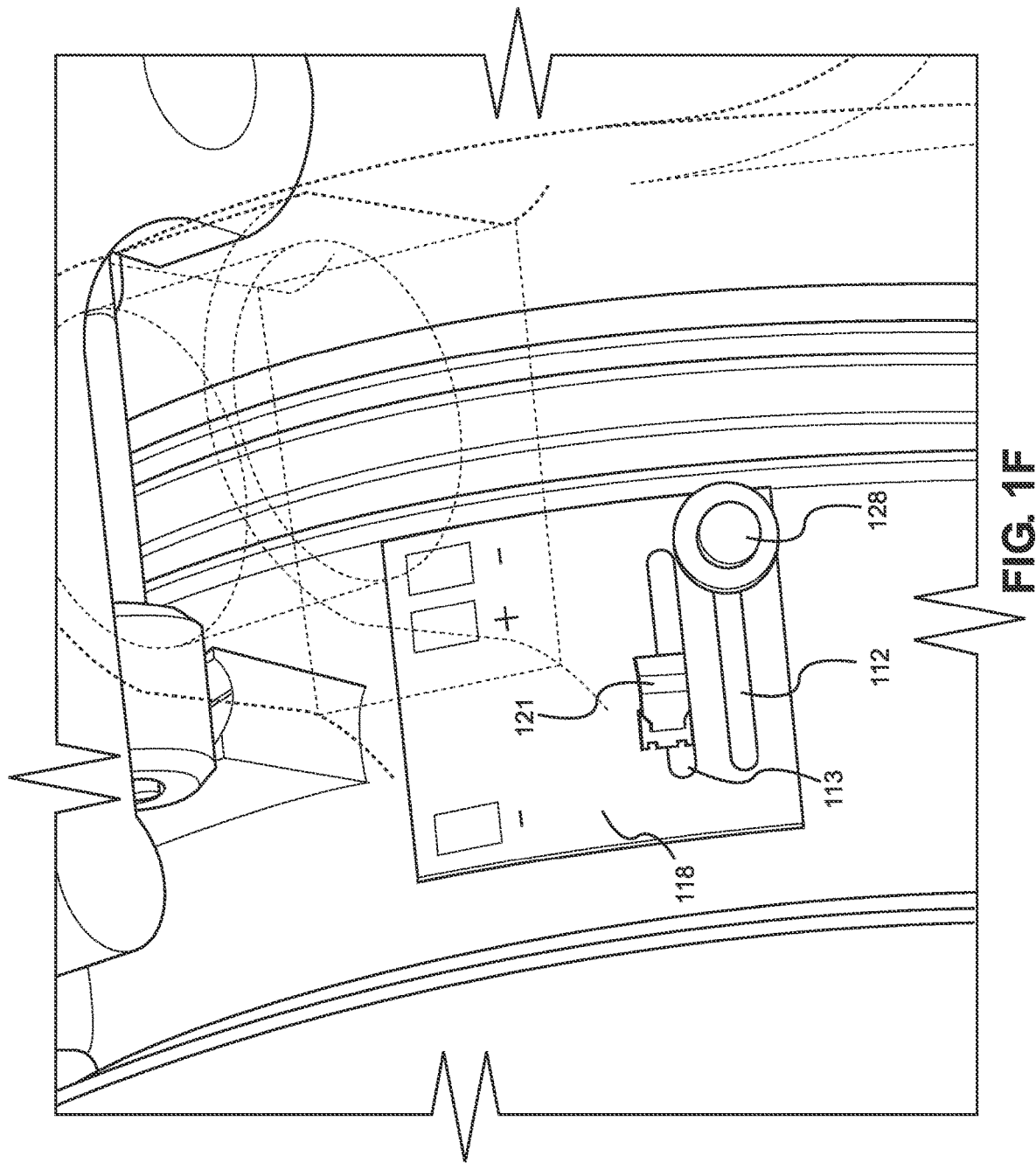
Figure 1G:
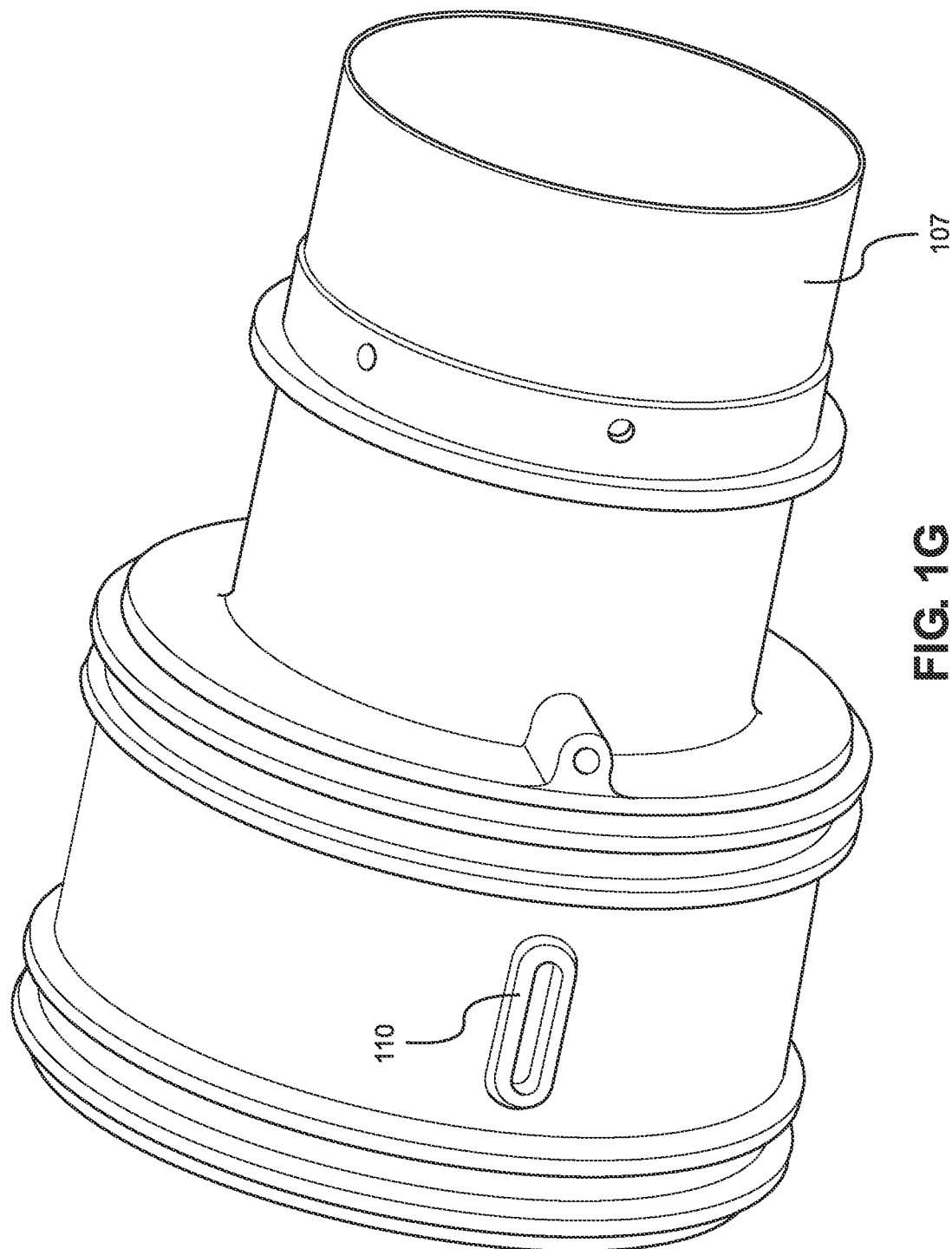

FIGS. 1e, 1f, and 1g depict top transparent, partial transparent, and partial perspective views, respectively, of another exemplary embodiment of an optical assembly.

Figure 2A:
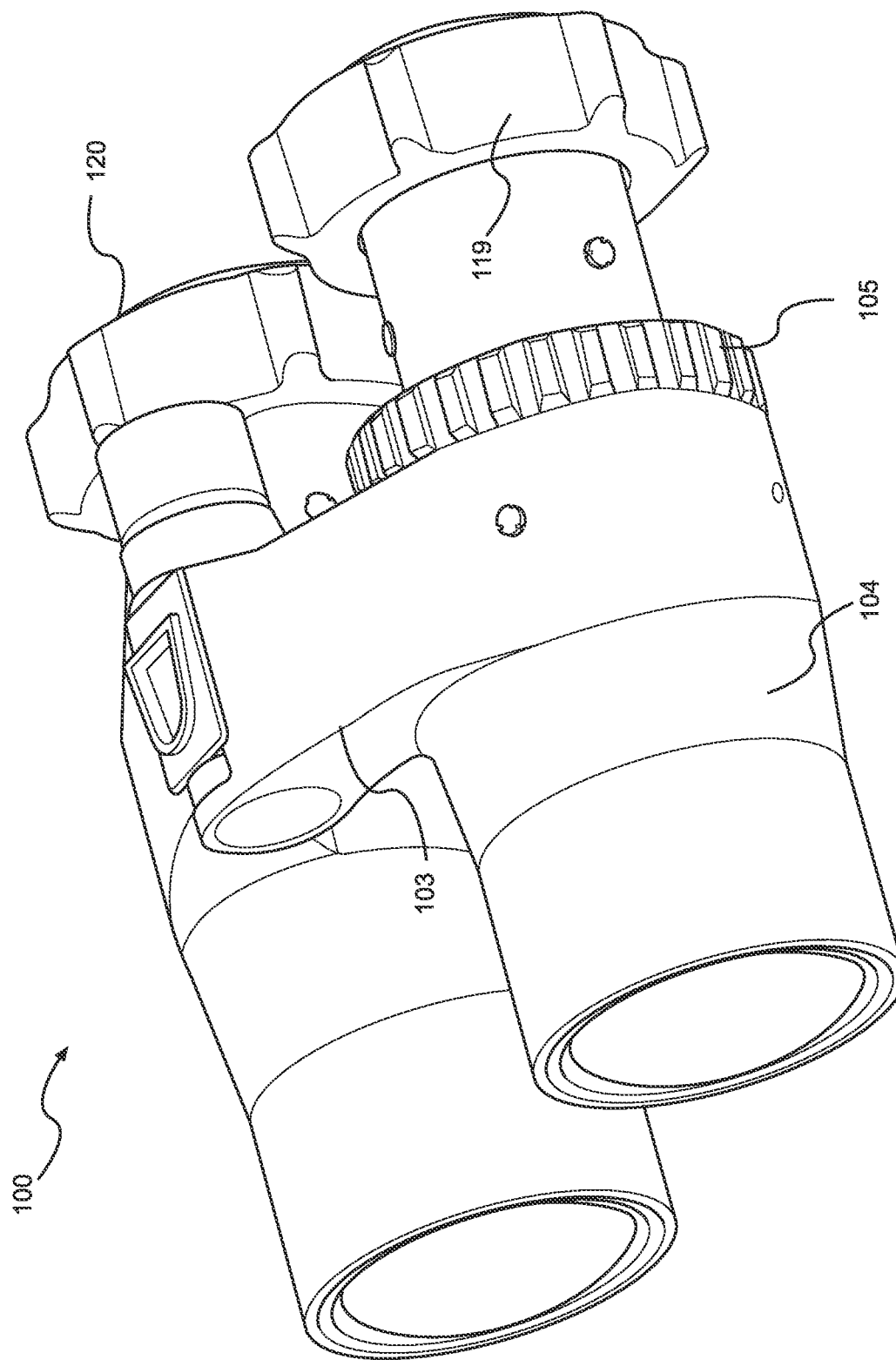
Figure 2B:
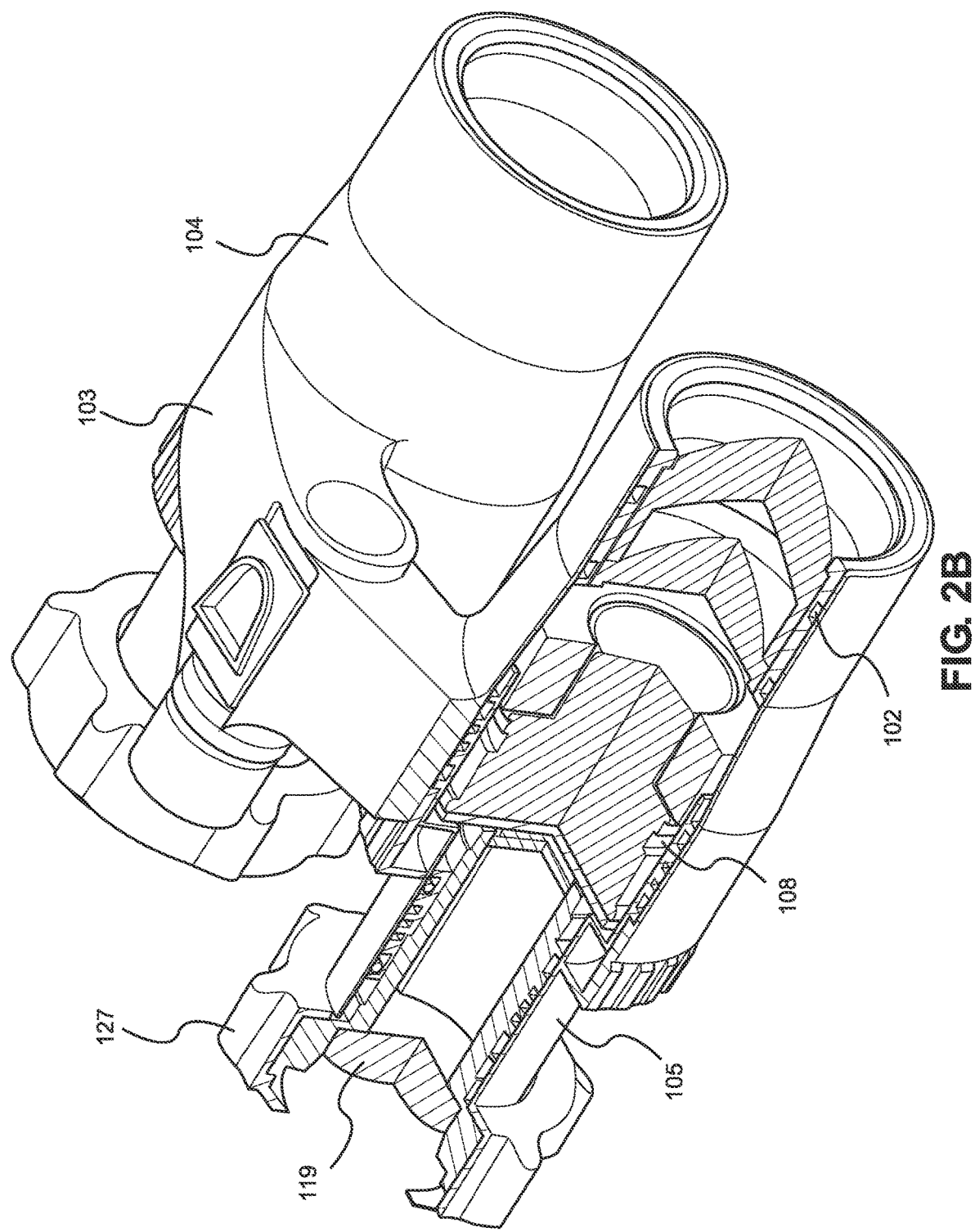
Figure 2C:
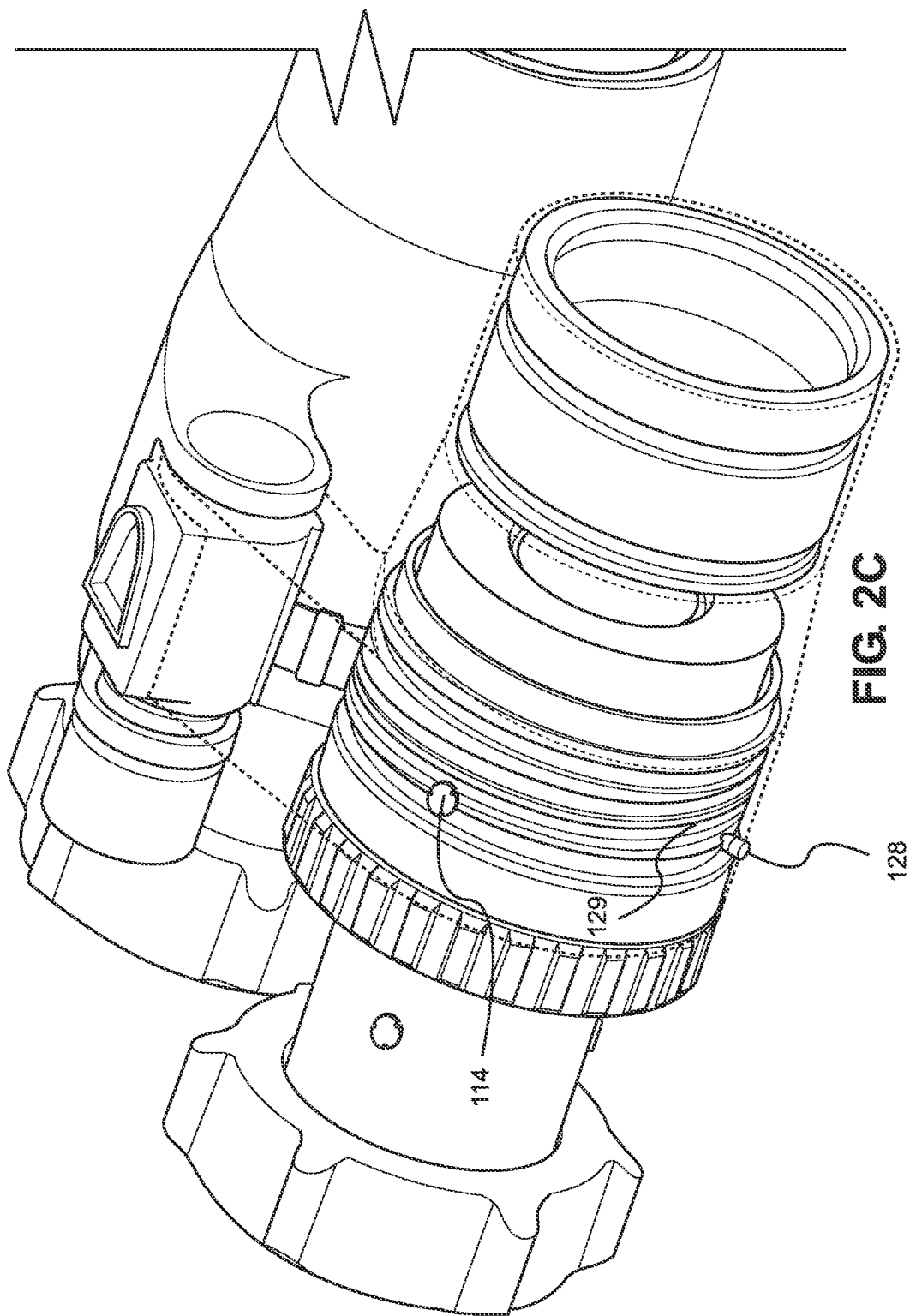

FIGS. 2a, 2b, and 2c depict perspective, partial cross-sectional, and partial transparent views, respectively, of another exemplary embodiment of an optical assembly.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Dimensions and materials identified in the drawings and applications are by way of example only and are not intended to limit the scope of the claimed invention. Any other dimensions and materials not consistent with the purpose of the present application can also be used. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

The proposed architecture consists of physically fixing the eyepiece within a mechanical envelope, placing the electro-optical sensor in a housing that moves for eyepiece focus, and installing the objective lens in the sensor housing. The eyepiece assembly has the features for mounting the device to external hardware such as helmet mounts, means for providing electrical power and or signals to the sensor housing, interface means for movement of the sensor, and the eyepiece itself. The electro-optical sensor assembly has the means of moving the sensor assembly relative to the eyepiece, receiving electrical signals to power the sensor and or other signals that may be necessary, and the means for holding and facilitating objective lens focus on the sensor input.

FIGS. 1a-1d show an embodiment of the optical assembly 100 as a PNVG device. Assembly 100 consists of four main subassemblies: the eyepiece housings 104, the monoculars 105, the objective lenses 119, and the mechanical mounting assembly 103. The assembly 100 includes two eyepiece housings 104 connected to a mechanical mounting assembly 103 that attaches to a user's headgear (not shown). The mechanical mounting assembly 103 is also known as the bridge and fore/aft assembly. The connection between the eyepiece housing 104 and the mechanical mounting assembly 103 may be integral or removable.

The objective lenses 119 and image sensing assemblies found in the monoculars 105 form an imaging channel 130, therefore, the exemplary assembly 100 as shown in FIGS. 1a-1d would have a total of four imaging channels 130. In certain embodiments, the channel 130 may have a non-adjustable collimation designed into the channel 130. At least one channel 130 in assembly 130 may incorporate an image display 131 for displaying an image through the eyepiece 102.

The two eyepiece housings 104 each have two eyepieces 102 which may be permanently fixed to the eyepiece housings 104, usually by a silicone rubber adhesive, but other means are acceptable. The eyepiece housing 104 also includes the elements allowing the monocular 105 to move relative to the eyepiece housing 104, while the objective lens 119 move relative to the monocular 105. This allow focusing of an image projected through the eyepiece 102 to an eye of the observer.

In the embodiment of FIG. 1a-1d, these elements are two monocular focusing pins 122 mounted to the inner surface of the enlarged mating portions 106 of the eyepiece housing 104 that receive the monocular 105. The corresponding outer surface of the monocular housing 107 will have movement features 110 that bear on these pins causing the monocular 105 to move along a specific path, which may be linear, helical, or a combination of both. In the specific PNVG embodiment the monocular focusing pins 122 will also be the means for provide voltage signals to the monocular 105.

The monocular 105 contains appropriate image sensor(s) 108, sensor electronics, and power supply 109 for the respective purpose. In exemplary embodiment, the image sensor 108 is an image intensifier tube and the power supply 109 is a high voltage power supply. These are encapsulated in the monocular housing 107 which has movement features 110 that mate to the monocular focusing pins 122 on the eyepiece housing 104 so that when the monocular 105 is rotated it moves in and out with respect to the eyepiece housing 104. In the embodiment of FIG. 1b movement features 110 are helical threads, but they could be a cam assembly or a sliding slot, as shown in FIGS. 1e and 1g. in any event, the monocular 105 moves back and forth to provide focus adjustment to the eyepiece 102. Thus, output image of the monocular 105 is now focusable for each person who uses the assembly 100, with adjustment possible during operation. Additionally, in the case of the PNVG, all monoculars 105 may be focused independently.

In the embodiment of FIG. 1b, the power connections 111 are part of the helical threads of the movement feature 110. One helical thread contains the positive connection 112, while the other helical thread contains the negative connection 113. In this embodiment, electrical contact is made to the monocular focusing pins 122 on the eyepiece housing 104, though other embodiments may use a separate electrical pin connection 128. To ensure the contact as well as isolate the positive from the negative, the power connections 111 can be implemented in various means.

In one embodiment, if the monocular housing 107 is of a conductive material such as, but not limited to aluminum, the power connections 111 may be made by directly plating conductive strips 129 along the helical threads of the movement features 110 in a slip ring type connection. The movement features 110 contain the positive connection 112 and the grounding, or negative connection 113. In such an embodiment, the negative connection 113 is made by directly plating a conductive strip 129 on the monocular housing 107, while the positive connection 112 includes a layer of metal oxide between the conductive strip 129 and the monocular housing 107. The metal oxide may be made by anodizing, after which the conductive strip 129 is made by a complementary plating process. The structure just described has the advantage of the metal monocular housing 107 providing a ground plane Faraday shield to protect the image sensor 108 and power supply 109 from electromagnetic inference (EMI). Alternatively, flex circuit strips 117 are disposed at the bottom of the helical threads 110. Wires leading to the power supply 109 are then soldered to the flex circuit strips 117.

In certain embodiments, additional conductive strips 129 may be disposed on the surface of the monocular housing 107 on additional areas of anodized metal. Non-limiting examples would be two conductive strips 129 for remote gain control of an image intensifier, or additional conductive strips 129 for basic items like a mini USB connection for transfer of basic information to a thermal camera. Connections may also be made to an external image display.

In the embodiment shown in FIGS. 1e-1g, focusing can also be translational, linearly moving the monocular 105 in and out of the eyepiece housing 104 without rotation of the monocular 105. In this embodiment, the movement feature 110 is at least one sliding slot. Straight conductive strips 129 formed as contacts on a flex circuit card 118 may serve as the positive connection 112 and the negative connection 113 for the monocular 105. An EMI filter may be part of the flex circuit card 118.

As an alternative or in addition to putting the conductive strips 129 on the monocular housing 107 or movement features 110, the monocular 105 may incorporate spring-biased contact pins 121 which press on the eyepiece housing 104 for electrical contact. In such an embodiment, the interior of the eyepiece housing 104 may be plated with conductive material, resulting in an electrical connection from the monocular 105 to the eyepiece housing 104 and thence to the batteries or other power supply 109. In this embodiment, the interior of the eyepiece housing 104 does not need to be a conductive strip 129, although such a design is contemplated in other embodiments.

This monocular housing 107 also has the necessary focus features to allow for objective lens 119 to move relative to the input of the sensor. In this specific embodiment there are focus pin holes and pins 114. Finally, the monocular housing 105 has integrated into it focus stops 115 and seals 116 for environmental robustness.

As pertaining to the objective lens 119, the objective lens 119 is a set of optical elements in an appropriately designed housing. The objective lens 119 includes the objective focus mechanism 123 for adjusting the objective focus relative to the input of the image sensor 108. In the exemplary embodiment, the objective focus mechanism 123 is at least one objective focus thread interference fit onto the objective lens barrel 124. A focus adjustment knob 127 mounted onto the objective lens barrel 124 allows a user to grasp and adjust the objective lens 119. The objective lens 119 also contains integral objective stops 125 and objective environmental seals 126.

One novel element is that the focus torque of the objective lens 119 is designed to be less than the focus torque of other parts of the optical assembly 100. In the prior art system designs, the focus torque was designed for independently for each lens. Because each rotated relative to a fixed housing it didn't matter if the required torque was stronger or looser than the eyepiece. However, in this case the focus operations run the risk of being lost without a deliberate attempt to make them distinct from each other. By way of non-limiting example, if the desired operation is for the eyepiece 102 to be focused first, then when the objective lens 119 is focused it is highly undesirable for the eyepiece 102 to move. Therefore, the two torques must be designed to be distinctly different so that when one focus is achieved it will not be lost when the other operation is attempted. The design features which allow independent focus may consist of, but are not limited to, O-ring materials with different durometers, significantly different O-ring compression, different joint designs, and other mechanisms which may be known in the art. Another embodiment uses different types of motion instead of different torques. One of the elements of eyepiece 102, monocular 105, and/or objective lens 119 focuses using linear translational movement (cam assembly or sliding slot) while another element uses rotational movement (helical threads) to focus.

It should be noted that O-rings also perform the function of environmental seals at the monocular/eyepiece interface. The O-ring glands 132a and 132b are also integral to the monocular housing 107. The O-rings 133 ride in the O-ring glands 132a and 132b and center the monocular 105 on the opto-mechanical axis of the eyepiece housing 104, seal the monocular housing 107, and provide the resistive force to differentiate the focus the monocular 105 with the eyepieces 102 and/or the objective lens 119. As used herein, any reference to O-rings 133 refers to any elastomeric ring having any type of cross-section. The objective lens 119 may be purged independently or simultaneously with the eyepiece 102 and the monocular 105.

While the description of the above optical assembly 100 has emphasized a PNVG system, other forms, such as, but not limited to, binoculars, monoculars, sensor fusion systems, and rifle scopes, are covered as well. An exemplary optical assembly 100 taking the form of binoculars is illustrated in FIGS. 2a-2c. One reason a user might want a fixed eyepiece is that such architecture simplifies the potting of the sensor in the monocular assembly. Co-pending U.S. patent application Ser. No. 16/503,297, the contents of which are incorporated herein by reference in their entirety, makes a claim for a lightweight night vision binocular; however, if price is more important than weight, then this approach will be less expensive but at a small weight penalty. Both architectures are considerably lighter than existing devices.

In the optical assembly 100 of FIG. 2a-2c, the eyepiece housing 104 has the eyepieces 102 fixed in the eyepiece housing 104 and the mechanical mounting assembly 103 integrated in the eyepiece housing 104. The monocular 105 includes an assembled objective lens 119. For this specific embodiment, a battery compartment 120 is mounted in the center of movement features 110. The eyepieces 102 are mounted in the eyepiece housing 104 while the image sensor 108 is mounted in the monocular housing 107. The focus mechanisms for the objective lens 119 and focus adjustment knob 127 are identical to function as described previously.

FIG. 2c illustrates another view of the key feature 110 for focus and electrical connection. The electrical pin connection 128 is a pin that is mounted into the eyepiece housing 104. The mating electrical connections are two conductive strips 129, plated on top of the movement features 110, which are helical threads in the present embodiment. As previously described, one conductive strip 129 is positive connection 112 and the other a negative connection 113. While not visible from the perspective of FIG. 2c, there are two electrical pin connections 128. Also shown is the focus pin 114. The whole monocular 105 is rotated in and out for focus while maintaining electrical connection as the electrical pin connections 128 follow the helical sweep of the movement features 110. Thus, the binocular goggle of FIG. 2a-2c has the same architecture as the wide field of view goggle of FIG. 1a-1f; fixed eyepiece 102 with respect to the mechanical mounting assembly 103, adjustable image sensor 108 for diopter focus, adjustable objective lens 119 and electrical contact means by which electrical contact is made while the image sensor 108 is moved with monocular 105. In another embodiment, only one conductive strip 129, helical or straight, is located on the monocular housing 107. In such an embodiment, the conductive strip 129 is a positive connection 112 to maintain electrical contact as the monocular 105 is moved, whether rotational or translational; ground is made directly to monocular with a spring-biased contact pin 121.

This design is not restricted to sensors 108 including round sensors such as image intensifiers. Rectangular sensors such as thermal or shortwave infrared (SWIR) sensors need to be slid linearly in order to keep the rectangular output image right side up. Rotating a rectangular sensor would tilt the image or even invert the image, both of which will appear to be unnatural to the user. Thus, for these sensors 108 the sliding focus mechanism would be needed.

In certain embodiments incorporating more than one sensor 108, the sensors 108 may be different types of sensors 108. By way of non-limiting example, one sensor 108 may be an image intensifying sensor, while another sensor 108 may be a thermal imaging sensor. Such sensors 108 may be activated whenever the assembly 100 is active, selectively activated or deactivated by a user, or automatically activated or deactivated by the assembly 100 in certain situations such as, but not limited to, when certain environmental conditions are met. By way of non-limiting example, an image intensifying sensor may be active when ambient light is below a certain level, while a thermal imaging sensor may be active when ambient light is above a certain level. In embodiments with multiple types of sensors 108, the images received from the sensors 108 may be fused in a display where the image from one sensor 108 is visually overlaid with the image from another sensor 108 so both are viewed simultaneously. A non-limiting example of such an architecture may be found in U.S. Pat. No. 10,582,133, the contents of which are incorporated herein by reference in their entirety.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be understood that the written description uses examples to disclose the invention, including the best mode, and also to enable any person skilled in the art to make anew the invention. Any dimensions or other size descriptions are provided for purposes of illustration and are not intended to limit the scope of the claimed invention. Additional aspects can include slight variations, as well as greater variations in dimensions as required for use in the industry. It is to be expected that various equivalents, alternatives and modifications are possible within the scope of the appended claims.

What is claimed is:

1. An optical device comprising:
   at least one eyepiece fixed in a physical position with respect to an observer; and
   at least one image sensing assembly having an image sensor, at least one electrical connection, and an output image through the eyepiece;
   at least one objective lens, the at least one objective lens and the at least one image sensing assembly forming at least one channel,
   wherein the at least one objective lens moves for focusing an image projected through the at least one eyepiece to an eye of the observer.

2. The optical device of claim 1 wherein the at least one objective lens moves to focus in relation to the at least one image sensing assembly.

3. The optical device of claim 1 wherein the at least one image sensing assembly independently focuses to the at least one eyepiece.

4. The optical device of claim 1 wherein the at least one objective lens is independently purged from the at least one eyepiece and the at least one image sensing assembly.

5. The optical device of claim 1 wherein the at least one objective lens is purged simultaneously with the at least one eyepiece and the at least one image sensing assembly.

6. The optical device of claim 1 wherein the at least one electrical connection is integrated into the at least one image sensing assembly.

7. The optical device of claim 1 wherein the at least one electrical connection provides electrical connection as the at least one image sensing assembly moves for focus.

8. The optical device of claim 1 wherein the at least one electrical connection is integrated as part of a focus mechanism.

9. The optical device of claim 1 wherein the at least one electrical connection is a slip ring type connection.

10. The optical device of claim 1 wherein the at least one electrical connection is a translational sliding type connection.

11. The optical device of claim 1 wherein the at least one electrical connection is a flex circuit.

12. The optical device of claim 1 wherein at least one of the at least one image sensing assembly and the at least one objective lens focuses through rotational movement and the other of the at least one image sensing assembly and the at least one objective lens focuses through translational movement.

13. The optical device of claim 1 wherein both of the at least one image sensing assembly and the at least one objective lens focus through rotational movement or translational movement.

14. The optical device of claim 1 wherein the channel of the at least one objective lens and the at least one image sensing assembly has a non-adjustable collimation designed into the channel.

15. The optical device of claim 1 wherein the at least one eyepiece is permanently fixed in relation to the at least one image sensor focus mechanism.

16. The optical device of claim 1 wherein at least one mechanical mounting assembly is integral to the eyepiece housing.

17. The optical device of claim 1 integrated into a night vision device containing an image intensifier.

18. The optical device of claim 1 integrated into a night vision device containing a thermal image sensor.

19. The optical device of claim 1 integrated into a night vision device containing at least 4 channels of objective lenses and image sensing assemblies, and at least 2 eyepieces.

20. The optical device of claim 1 integrated into a night vision device wherein an image display is connected to the image sensing assembly.

21. The optical device of claim 1, wherein the at least one channel further comprises at least one image display.

22. The optical device of claim 1, wherein the at least one image sensing assembly further comprises at least a first image sensing assembly and a second image sensing assembly, the first image sensing assembly having a first image sensor and the second image sensing assembly having a second image sensor, wherein the first image sensor and the second image sensor are different types of imaging sensors.

23. The optical device of claim 22, wherein the output image through the eyepiece is a combination of an image from at least the first image sensor and an image from the second image sensor.

\* \* \* \* \*